United States Patent [19]

Miller, Jr. et al.

[11] 4,253,665
[45] Mar. 3, 1981

[54] POLYMER ALLOY BOWLING BALL

[75] Inventors: Charles M. Miller, Jr.; Samuel J. Orlando, both of San Antonio, Tex.

[73] Assignee: Columbia Industries, Inc., San Antonio, Tex.

[21] Appl. No.: 92,981

[22] Filed: Nov. 9, 1979

[51] Int. Cl.³ .................... A63B 37/14; A63B 37/12
[52] U.S. Cl. ........................ 273/63 G; 273/DIG. 9; 260/31.8 M; 260/31.8 XA; 156/245
[58] Field of Search ................ 273/63 R, 63 G, 58 J, 273/DIG. 9; 260/31.8 M, 31.8 XA

[56] References Cited

U.S. PATENT DOCUMENTS 3,068,007  12/1962  Satchell ............................. 273/63 G
4,131,277  12/1978  Randolph ........................ 273/63 G X Primary Examiner—George J. Marlo
Attorney, Agent, or Firm—Gunn & Lee

[57] ABSTRACT

A bowling ball having a thin viscous film deposited upon its surface from within the ball for increasing the coefficient of friction between the ball and the bowling lane. The film comprises a saturated plasticizer incorporated into the ball at the time of manufacture that slowly exudes from the outer shell over an extended period. The method comprises preparing a resin blend capable of being cured into a tough, durable material and mixing the resin blend with a plasticizer which is miscible with the liquid phase resin blend, but incompatible with the solid phase. Catalysts are admixed and heat is applied to the mixture to cure the resin blend into a tough and durable outer shell having a 72 Shore D hardness.

29 Claims, No Drawings

POLYMER ALLOY BOWLING BALL

BACKGROUND OF THE INVENTION

Bowling balls have been made from a variety of materials and by various methods as shown by the prior art (U.S. Pat. Nos. 3,068,007; 3,318,727; 3,411,781; 3,517,933). These bowling balls are strong and durable but have a slick surface. The slick surface causes the bowling ball to have a relatively low coefficient of friction with the lane. In bowling, it is most advantageous to strike the pins from an angle and not head on. Experienced bowlers have developed their skills to control their ball so it will curve or "hook" prior to striking the pins, thus producing more strikes and higher scores. The bowling ball disclosed in U.S. Pat. No. 4,131,277 has a surface composed of a matrix of strong impact resistant resin containing domains of elastomeric material chemically bonded to the surrounding matrix. This surface provides the bowling balls with improved frictional engagement with the bowling lane surface.

SUMMARY OF THE INVENTION

The present application shows a unique combination of resins and plasticizer and a novel production method which yield a bowling ball that has a continuous thin film on its surface, said film being non-toxic and non-corrosive. This film provides an increased coefficient of friction between the bowling ball and the bowling lane surface, thus enabling the bowler to control the ball more satisfactorily.

The present invention also overcomes problems of the prior art in providing such a bowling ball having sufficient durability, hardness and toughness. The present invention also provides a method for producing such a bowling ball.

DETAILED DESCRIPTION

The bowling ball of the present invention comprises at least one unsaturated resin, at least one catalyst, and a saturated plasticizer. Conventional additives known in the art, such as pigments, fillers, solvents, diluents, etc., may also be present.

Bowling balls are typically manufactured having a single outer shell placed about a single inner core and the invention has been described in this mode also. It is additionally possible to create solid bowling balls or ones having many shells or cores and it is understood that the invention is also applicable to these types of bowling balls also. In those instances, "outer shell" refers to the outermost spherical layer of the bowling ball.

Although certain relatively tough and strong resins could be used as the sole resin in the invented bowling ball, such resins are generally prohibitively expensive. A resin blend of a rigid resin and flexible resin ("rigid" and "flexible" being known in the art) is therefore preferably used. Since a single resin could be used, the resin blend percentages disclosed below are by way of illustration rather than of limitation.

As disclosed below, an inert plasticizer in the amount of about 5 percent by weight to about 25 percent by weight will be present within the cured outer shell of the bowling ball. This fact itself necessitates recognizing many critical limitations since the selection of the resin blend components in the remaining portion of the outer shell must meet minimum criteria for the outer shell to be useful. One minimum criteria is that the outer surface of bowling balls must register a hardness of at least 72 Shore Durometer D (Shore D hardness) in order to be approved by the American Bowling Congress (ABC). Because most bowlers limit their purchases of bowling balls to those approved by the ABC, satisfaction of this criteria is commercially very important. A large amount of an inert plasticizer in the outer shell of a bowling ball is detrimental to producing a hard bowling ball by sterically hindering resin cross-linking and through dilution. An additional problem is that the preferred plasticizers are slightly acidic and chemically interfere with the multiple cross-linking between unsaturated resin chains. The plasticizer thus both physically and chemically interferes with producing a sufficiently hard bowling ball. The resins selected, therefore, must be capable of being cured and treated to produce a bowling ball of 72 Shore D hardness.

Also, the outer shell must be sufficiently tough and durable to prevent the bowling ball from chipping, cracking, or otherwise deteriorating due to repeated inertial shocks and frictional wear over the bowling ball's useful life of many years.

The cured resin blend with interspersed plasticizer must also be permeable to allow the plasticizer to exude through the outer shell to form a thin film upon the bowling ball surface. The blend must also be unreactive with the plasticizer or the plasticizer will become chemically bound to the resins and not be exuded. Possible resins for the blend are limited to those with which the plasticizer is miscible in the liquid phase of the resin, but incompatible with the plasticizer in the solid phase of the resin and unreactive with the plasticizer in both phases.

The cured resin blend must be sufficiently porous to allow the plasticizer to exude through it to the surface. The forces causing the exudation are a combination of capillary action and the differential pressures created by the constant depletion of plasticizer at the surface. In addition to these criteria, a resin blend should be selected which will slowly force the plasticizer out of the bowling ball and to the bowling ball's surface. Thermosetting resins continue to react for a considerable period of time after their initial cure. This continued forming of cross-linkage bonds between the chains pulls the chains more tightly together and upon a gross scale cause thermoset resin products to measurably shrink in size over time. Thermoplastic resins do not perform in this manner.

Because the plasticizer is held within but not bonded to the thermoset resin outer shell, pressure to escape is placed upon the plasticizer as the resin shell contracts. The fluid and inert nature of the plasticizer allows this pressure to be partially relieved due to escape of the plasticizer through the permeable resinous matrix of the outer shell and to the surface of the bowling ball.

The rigid polyester resin is preferably an orthophthalic polyester made from phthalic anhydride, maleic anhydride, propylene glycol, and styrene. A propylene glycol phthalic anhydride styrene maleic anhydride compound identified as RCI 32-113, and available from Reichhold Chemicals Incorporated, is preferred although other suitable rigid polyester resins may be utilized. This rigid resin can be present in the blend in amounts ranging from about 40 to 80 percent by weight, preferably 57 percent by weight.

The flexible polyester resin may be an isophthalic or orthophthalic polyester made from isophthalic or orthophthalic anhydride, maleic anhydride, adipic acid, propylene glycol and styrene. An isophthalic anhydride propylene glycol styrene maleic acid adipic acid compound identified as RCI 31-832, and available from Reichhold Chemicals Incorporated is preferred although other suitable flexible polyester resins may also be used. It can be present in the blend in amounts ranging from about 5 to 40 percent by weight, preferably 32 percent by weight. Other similar flexible resins in various blends and ranges may also be used.

A single tough resin can be used almost exclusively to form the outer shell, but it is preferred to use a blend of resins. Many different resin blend types, ranges, and percentages may also be used as long as the above described requirements of the overall resin blend are satisfied. Other useful components for constructing the outer shell are polyurethane, vinyl esters, epoxy or other thermoset materials.

The plasticizer is unique to the blend in that it must meet several criteria. It must not contain maleic anhydride or fumaric acid or any other unsaturated dicarboxylic acid since these materials would allow cross-linking between the plasticizer and the unsaturated resins in the blend. Such cross-linking would prevent achievement of the desired end product because it would bind the plasticizer within the resin ball and prevent the plasticizer from being exuded to the bowling ball surface.

The plasticizer should also be completely soluble with the unsaturated resins in their liquid phase before they are cured to enable it to be uniformly dispersed throughout the resin blend. This prevents encapsulation of the plasticizer within small pockets surrounded by impermeable cured resin barriers. Such entrapment would prevent the desired exudation of the plasticizer to the surface of the ball. Further, such exudation as might occur under such circumstances might not be uniform. If the plasticizer is not completely miscible with the liquid phase resin blend, the permeability of the cured resin blend to flow by the plasticizer might be uneven. Further, uniformly distributing the plasticizer within the resin blend is facilitated if the plasticizer is miscible therein. All of these considerations are important in achieving a final product which uniformly exudes the plasticizer to the surface of the ball over an extended period of time. Failure to achieve this result would produce an unmarketable product.

The plasticizer's molecular weight must be low enough to enable it to exude through the permeable cured resin at a sufficient rate to maintain a thin sticky, but not oily, film of plasticizer upon the bowling ball surface. Because the film of plasticizer upon the surface will be depleted upon use of the bowling ball, the rate of exudation must be sufficient to prevent unreasonably long waits between uses of the bowling ball due to an absence or uneveness of the plasticizer film.

The plasticizer's molecular weight must also be high enough to prevent a rapid exuding of the plasticizer such that it forms droplets upon the surface. Such rapid movement of the plasticizer through the cured resin would not only create a bowling ball surface having variable coefficients of friction thereon, but would also rapidly deplete the ball of plasticizer and thus end its advantage over normal bowling balls. The molecular weight and composition of the plasticizer must also be sufficient to insure an extremely low volatility so that the plasticizer does not evaporate off of the ball more rapidly than it is deposited from within the ball. The plasticizer has a preferred average weight average molecular weight of 450 to 550, a molecular weight distribution of approximately 1.4, and a viscosity of 150 to 250 cps.

Finally, unless the plasticizer is a viscous material, it will not perform the beneficial function desired of it; of giving the bowling ball surface the characteristics of having a high coefficient of friction. It must additionally be non-toxic and non-corrosive in order to render it commercially salable.

Plasticizers that meet these requirements are the condensation products of a polyhydroxy alcohol and a saturated dicarboxylic acid wherein the mole ratio of alcohol to acid is between 1:1 and 2:1. The average weight average molecular weight of the condensation product is between 100 and 1500 and the molecular weight distribution ranges from 1.2 to 1.7. Suitable polyhydroxy alcohols may be one or more of the ether linked polyhydroxy alcohols, such as diethylene glycol, dipropylene glycol, triethylene glycol, and tripropylene glycol with diethylene glycol the most preferred. Other glycols that may also be utilized are ethylene glycol, propylene glycol, butylene glycol, glycerol, and trimethylene glycol.

Suitable acids may be selected from saturated straight chain aliphatic dicarboxylic acids having 2 to 10 carbon atoms, branched chain derivatives of saturated aliphatic dicarboxylic acids having 2 to 10 carbon atoms, and saturated aromatic dicarboxylic acids. Mixtures of one or more of these acids may be used.

After much experimentation, the preferred plasticizer was found to be a diethylene glycol adipic acid ester modified with phthalic anhydride and having a weight average molecular weight of approximately 520 with a molecular weight distribution of 1.4, and a viscosity of approximately 200 cps Brookfield at 25° C. While the plasticizer may be usefully used in amounts of from about 5–25% by weight of the overall resin/plasticizer mixture, it is perferably present in about 11% by weight. As the percentage of plasticizer is reduced below the lower limit of the range, the exudation of the plasticizer from the ball and consequently the beneficial results sought are reduced to such an extent as to make the process commercially impractical. As the percentage of plasticizer is increased above the upper limit of the range, the hardness and toughness of the bowling ball is decreased, its impact resistance reduced, curing of the resin matrix is severely retarded, and again a commercially unusable product produced.

A means of regulating the flow of plasticizer in addition to the prolonged pushing of the plasticizer due to the thermoset resin shell shrinking is use of a plasticizer having components which have different flow rates within the cured resin. The preferred plasticizer is composed primarily of a diethylene glycol-adipic acid polyester which consists of variable chain lengths meeting the distribution described above. The shorter products migrate more rapidly to the surface than the average plasticizer molecule while the higher molecular weight longer products take longer to reach the surface of the bowling ball. In addition, about 0.5 to about 3 percent by weight of the plasticizer is composed of phthalic anhydride which is added to act as an anchor upon a portion of the plasticizer molecules. The phthalic anhydride sterically hinders the plasticizer molecules and slows these molecules down in relation to the other plasticizer molecules and thus further extends the useful life of the ball as a friction enhanced bowling ball. Other compounds that may also sterically hinder the plasticizer molecules are neopentyl glycol, glycerol, or dimethyl glutaric acid, for example.

Conventional art recognized additives may be admixed with the resin and plasticizer blend to produce a desired result. Almost any free radical type initiator will suffice as a reaction catalyst. It is preferred, however, to use a mixture of 2,4-pentanedione and 12% cobalt octoate as the promoter, a catalyst mixture of methyl ethyl ketone peroxide, t-butyl perbenzoate, and di-t-butyl peroxide, an antifoam agent, such as the silicone surfactant "Antifoam A" manufactured by Dow Corning, various pigments and solvents, all in amounts that are well-known and conventional in the art.

Selection of proper catalysts and promoters is critical to achieving a commercially useable bowling ball. As explained above, the presence of the inert and acidic plasticizer is detrimental to the structural integrity of the bowling ball. If the proportion of plasticizer needed can be effectively reduced, a better bowling ball may be produced therefor. Initial experiments produced workable bowling balls using only methyl ethyl ketone peroxide as a catalyst and 25 percent plasticizer by weight. These bowling balls were, however, of poor quality. It was subsequently found that by increasing the bonding between the resin chains that greater pressure could be exerted upon the plasticizer within the bowling ball to exude to the surface. Less plasticizer was, therefore, needed in subsequent resin/plasticizer mixtures, the lower plasticizer levels allowing for even more bonding between resin chains and greater pressure upon the plasticizer to exude necessitating use of lesser amounts of plasticizer, etc. This beneficial result is accomplished by using a combination of catalysts and promoters designed to more effectively cause bonding between the resin chains. The preferred combination of catalysts was found to be methyl ethyl ketone peroxide, from 400 to 600 grams, preferably 550 grams; t-butyl-perbenzoate from 100 to 500 grams, preferably 300 grams; di-tert-butyl peroxide from 200 to 500 grams, preferably 350 grams; all amounts being based upon a standard 740 pound batch of resin and plasticizer. A promoter 12% cobalt octoate, from 150 to 300 grams, preferably 210 grams, and 2,4-pentanedione from 0 to 25 cc, preferably 4 cc, is also used. This effect may be achieved by many and innumerable modifications of these additives to achieve the above described results.

The processing parameters, such as resin temperature, gelling oven temperature, cure temperature, are likewise critical in order to achieve a ball having the desired properties. The temperature of the resins should be maintained between about 70° F. and about 100° F., preferably between about 80° F. and about 90° F., while mixing the ingredients of the blend and pouring the blend into the molds. The gelling oven should be held at a temperature of from about 105° F. to about 125° F., preferably between about 116° F. and about 118° F., until gellation occurs in approximately one to two hours. The curing oven should have a temperature between about 100° F. and about 120° F., preferably between about 180° F. and about 112° F. Care must be exercised when handling the molds prior to complete curing to avoid tearing the partially cured shell of the ball.

The ball of the instant invention remains in the fragile green state for a considerably longer period of time than a conventional ball and any rough treatment prior to full curing may produce an unsatisfactory product. The molds are placed in the curing oven overnight at reduced temperatures (as compared to the gelling oven temperatures), but only after a good firm gel state has been obtained and the danger of tearing the shell is reduced.

Any tanks, drums, or lines used to transport or store the resins and plasticizer should be constructed of plastic, stainless steel, or aluminum or be plastic lined. Even trace levels of the order of 5 to 10 ppm of contaminants like iron, copper, zinc, etc. will drastically affect the cure of the blend and reduce the desired properties of the product.

The following examples are offered to demonstrate possible embodiments and are not intended to limit the invention.

EXAMPLE 1

To a mixer, 422 pounds (57 percent by weight based on the total weight of the resins and plasticizer) of rigid orthophthalic polyester resin RCI 32-113, manufactured by Reichhold Chemicals Incorporated, was blended with 80 pounds (11 percent by weight) of phthalic anhydride modified diethylene glycol-adipic acid polyester plasticizer weight average molecular weight of approximately 520, molecular weight distribution approximately 1.4, RCI 97-171, manufactured by Reichhold Chemicals Incorporated, and 238 pounds (32 percent by weight) of flexible isophthalic polyester resin RCI 31-832, manufactured by Reichhold Chemicals Incorporated. A promoter, 12% cobalt octoate, 210 grams, was then added to the mixer with a minimum amount of styrene. Various pigments and an antifoaming agent, Dow Corning Antifoam A, were then added to the blend and mixed thoroughly. A mixture of 550 g 60% methyl ethyl ketone peroxide, 300 g t-butyl perbenzoate and 350 g di-tert-butyl peroxide was then added to the mixer. Lastly, 4.0 cc 2,4-pentanedione was added and the blend completely mixed. Molds were filled using a conventional vacuum filling procedure and placed in a 115° F. to 120° F. gelling room. After the molds properly gelled, they were transferred to a 105° F. to 110° F. oven to cure overnight. The ball was subsequently machined and polished in the usual manner. This is the preferred embodiment.

EXAMPLE 2

To a mixer, 605 pounds (80.7 percent by weight based on the total weight of the resins and plasticizer) of rigid orthophthalic polyester resin RCI 32-113, was blended with 45 pounds (6 percent by weight) of extra flexible orthophthalic polyester resin RCI 31-820 and 100 pounds (13.3 percent by weight) of polyester plasticizer RCI 97-171. A promoter, 12% cobalt octoate, 210 g, was then added to the mixer with a minimum amount of styrene. Pigments and antifoaming agents were mixed with the blend. A combination of 500 g methyl ethyl ketone peroxide, 600 g t-butyl perbenzoate, and 350 g di-t-butyl peroxide was then added to the mixer. The 2,4-pentanedione (4.0 cc) was lastly added and the blend processed as in Example 1.

EXAMPLE 3

The same procedure was followed as in Examples 1 and 2 using 460 pounds (61.3 percent by weight) of a rigid unsaturated polyester resin RCI 32-113, 180 pounds (24 percent by weight) of a flexible unsaturated polyester resin RCI 31-832, 10 pounds (1.3 percent by weight) of an extra flexible orthophthalic unsaturated polyester resin RCI 31-820, and 100 pounds (13.3 percent by weight) of a polyester plasticizer RCI 97-171. The mixture of catalysts was 450 g methyl ethyl ketone peroxide, 550 g t-butyl perbenzoate, and 350 g di-t-butyl peroxide.

While the invention has been described in connection with the preferred embodiment, it is not intended to limit the invention to the particular forms set forth, but, on the contrary, it is intended to cover such alternatives, modifications, and equivalents as may be included within the spirit and scope of the invention as defined by the appended claims.

We claim:

1. A bowling ball having a film exuded on the surface of said bowling ball from within said bowling ball comprising:
    an outermost shell of said bowling ball comprised of at least one cured solid phase thermosetting resin and a plasticizer;
    said cured thermosetting resin being of a sufficient type and sufficient percent by weight of said outermost shell to make said outermost shell sufficiently hard and tough to be useful as a bowling ball outer shell;
    said plasticizer being flowable through said cured thermosetting resin to said surface of said bowling ball to exude a film of said plasticizer upon said surface of said bowling ball; and
    said film being sufficiently viscous to give said surface of said bowling ball characteristics of a bowling ball surface having a high coefficient of friction.

2. The bowling ball of claim 1 wherein said cured solid phase thermosetting resin is derived from a substantially unsaturated liquid phase resin and said plasticizer is substantially saturated and unreactive with said thermosetting resin.

3. The bowling ball of claim 2 wherein said plasticizer is substantially miscible in said precurser liquid phase of said cured solid phase thermosetting resin.

4. The bowling ball of claim 2 wherein the molecular weight of said plasticizer is sufficiently low to allow said plasticizer to flow at a rate through said bowling ball outer portion sufficient to maintain a film of said plasticizer upon said surface of said bowling ball and the molecular weight of said plasticizer is sufficiently high to prevent said plasticizer from flowing through said bowling ball outer shell.

5. The bowling ball of claim 2 wherein said plasticizer is present in said outer shell in amounts ranging from about 5 to about 25 percent by weight of said outer shell.

6. The bowling ball of claim 5 wherein said plasticizer is a condensation product of glycol and a saturated acid, said condensation product having a mole ratio of glycol to acid of 1:1 to 2:1, the average weight average molecular weight of said plasticizer ranging from about 100 to about 1500, the molecular weight average from about 1.2 to 1.7.

7. The bowling ball of claim 6 wherein said plasticizer is modified by addition of from about 0.5 to about 3 percent by weight of a compound which will sterically hinder said plasticizer and effectively reduce the rate of flow through said outer shell of said plasticizer molecules to which it is added.

8. The bowling ball of claim 5 wherein said plasticizer is comprised of molecules of variable size and of variable molecular weight and has a molecular weight distribution of approximately 1.4 and wherein said differentially sized molecules have different rates of flow through said bowling ball outer shell.

9. The bowling ball of claim 1 wherein said bowling ball registers at least 72 hardness upon a Shore D Durometer.

10. The bowling ball of claim 9 wherein said outermost shell is sufficiently permeable to said plasticizer to allow said plasticizer to exude in sufficient amounts upon said surface of said bowling ball to give said bowling ball characteristics of a bowling ball having a high coefficient of friction.

11. The bowling ball of claim 10 wherein said outermost shell continues to contract for at least thirty days after completion of the manufacture of said bowling ball, said continued contraction being effective to facilitate exudation of said plasticizer through said outer shell.

12. The bowling ball of claim 11 wherein said outermost shell is sufficiently hard and tough to withstand such repeated inertial shocks as said bowling ball may reasonably be expected to undergo during one year's normal use as a bowling ball.

13. The bowling ball of claim 1 wherein said plasticizer and said thermosetting resin are substantially uniformly distributed throughout said outer shell, said exudation of said plasticizer through said thermosetting resin to said surface of said bowling ball is substantially uniform throughout said outer shell, and said film is of a substantially uniform thickness upon substantially all of said surface of said bowling ball.

14. A bowling ball having a thin film deposited on the surface from within said bowling ball comprising:
    a blend of rigid unsaturated polyester resin, flexible unsaturated resin, saturated polyester plasticizer, and additional sufficient catalysts and promoters to cause curing of said rigid and flexible unsaturated polyester resins into a strong and durable ball without binding said plasticizer to said resins.

15. The bowling ball of claim 14 wherein the saturated polyester plasticizer is a condensation product of a glycol and a saturated acid, said condensation product having a mole ratio of glycol to acid of 1:1 to 2:1 and an average weight average molecular weight between 100 and 1500 and a molecular weight distribution of between about 1.2 and 1.7.

16. The bowling ball of claim 15 wherein the glycol is one or more glycols selected from the group consisting of diethylene glycol, dipropylene glycol, triethylene glycol, tripropylene glycol, ethylene glycol, propylene glycol, butylene glycol, glycerol, and trimethylene glycol.

17. The bowling ball of claim 15 wherein the acid is one or more acids selected from the group consisting of saturated straight chain aliphatic dicarboxylic acids having 2 to 10 carbon atoms, branched chain derivatives of saturated aliphatic dicarboxylic acids having 2 to 10 carbon atoms and saturated aromatic dicarboxylic acids.

18. The bowling ball of claim 17 wherein the glycol is one or more glycols selected from the group consisting of diethylene glycol, dipropylene glycol, triethylene glycol, tripropylene glycol, ethylene glycol, propylene glycol, butylene glycol, glycerol, and trimethylene glycol.

19. The bowling ball of claim 18 wherein the acid is adipic acid and the glycol is diethylene glycol.

20. The bowling ball of claim 19 wherein the viscosity of the condensation product has been modified by the addition of phthalic anhydride.

21. The bowling ball of claim 14 wherein the rigid unsaturated polyester is an orthophthalic polyester and the flexible unsaturated polyester is an isophthalic polyester.

22. The bowling ball of claim 14 wherein the rigid unsaturated polyester is present in the blend in amounts from about 40 to about 80 parts by weight, the flexible unsaturated polyester is present in amounts from about 5 to about 40 parts by weight, and the saturated polyester plasticizer is present in amounts from about 5 to about 25 parts by weight.

23. The bowling ball of claim 22 wherein the saturated polyester plasticizer is a condensation product of a glycol and a saturated acid, said condensation product having a mole ratio of glycol to acid of 1:1 to 2:1 and an average weight average molecular weight between 100 and 1500 and a molecular weight distribution of about 1.2 to 1.7.

24. The bowling ball of claim 23 wherein the glycol is one or more glycols selected from the group consisting of diethylene glycol, dipropylene glycol, triethylene glycol, tripropylene glycol, ethylene glycol, propylene glycol, butylene glycol, glycerol, and trimethylene glycol.

25. The bowling ball of claim 23 wherein the acid is one or more acids selected from the group consisting of straight chain saturated aliphatic dicarboxylic acids having 2 to 10 carbon atoms, branched chain derivatives of saturated aliphatic dicarboxylic acids having 2 to 10 carbon atoms, and aromatic saturated dicarboxylic acids.

26. The bowling ball of claim 25 wherein the glycol is one or more glycols selected from the group consisting of diethylene glycol, dipropylene glycol, triethylene glycol, tripropylene glycol, ethylene glycol, propylene glycol, butylene glycol, glycerol, and trimethylene glycol.

27. The bowling ball of claim 26 wherein the acid is adipic acid and the glycol is diethylene glycol.

28. The bowling ball of claim 27 wherein the viscosity of the condensation product has been modified by the addition of phthalic anhydride 29. A bowling ball having a thin film deposited on its surface from within said bowling ball comprising a blend of approximately 57 parts by weight rigid orthophthalic polyester resin, approximately 32 parts by weight flexible isophthalic polyester resin, and 11 parts by weight phthalic anhydride modified diethylene glycoladipic acid ester plasticizer and additional sufficient catalysts and promoters to cause curing of said rigid and flexible polyester resins into a strong and durable ball without binding said plasticizer to said resins.

* * * * *